US 7,062,917 B2

(12) United States Patent
Wunning et al.

(10) Patent No.: US 7,062,917 B2
(45) Date of Patent: Jun. 20, 2006

(54) COMBUSTION CHAMBER WITH FLAMELESS OXIDATION

(75) Inventors: Joachim G. Wunning, Leonberg (DE); Joachim A. Wunning, Leonberg (DE)

(73) Assignee: WS Warmeprozesstechnik GmbH, Renningen (DE)

( * ) Notice: Subject to any disclaimer, the term of this patent is extended or adjusted under 35 U.S.C. 154(b) by 58 days.

(21) Appl. No.: 10/511,874

(22) PCT Filed: Apr. 22, 2003

(86) PCT No.: PCT/DE03/01319

§ 371 (c)(1),
(2), (4) Date: Oct. 18, 2004

(87) PCT Pub. No.: WO03/091626

PCT Pub. Date: Nov. 6, 2003

(65) Prior Publication Data

US 2005/0155351 A1    Jul. 21, 2005

(30) Foreign Application Priority Data

Apr. 23, 2002    (DE) .............................. 102 17 913

(51) Int. Cl.
*F02C 11/00* (2006.01)

(52) U.S. Cl. .......................................... 60/750; 60/749
(58) Field of Classification Search .................. 60/804, 60/746, 747, 750, 749
See application file for complete search history.

(56) References Cited

U.S. PATENT DOCUMENTS

| 3,309,866 A | * | 3/1967 | Kydd ........................... 60/751 |
| 5,154,599 A | * | 10/1992 | Wunning ..................... 431/215 |
| 5,727,378 A | * | 3/1998 | Seymour ...................... 60/804 |
| 6,234,092 B1 | * | 5/2001 | Domschke et al. ......... 110/238 |

FOREIGN PATENT DOCUMENTS

| EP | 0698764 | * | 7/1995 |
| WO | WO01/11215 | * | 2/2001 |

* cited by examiner

*Primary Examiner*—Ted Kim
(74) *Attorney, Agent, or Firm*—Leydig, Voit & Mayer, Ltd.

(57) ABSTRACT

A combustion chamber (5) for a gas turbine is adapted for flameless oxidation of fuels. This circulation flow has an internal space (9) in which a large-volume circulation flow is established. To this end, the combustion chamber supplies a hot exhaust stream to the introduced air, the mass flow rate of which exceeds the fresh air stream. The fresh air and the fuel are fed to the combustion chamber in the same direction, roughly parallel to the wall.

20 Claims, 2 Drawing Sheets

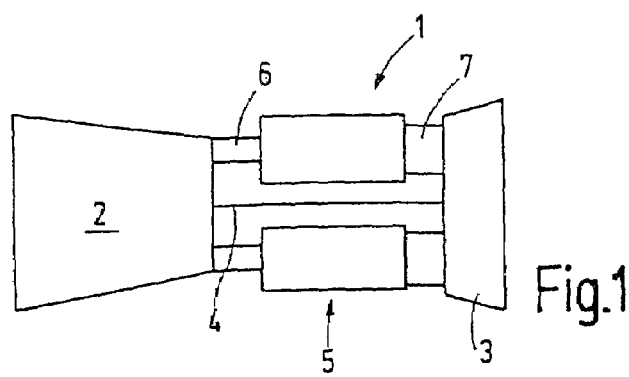
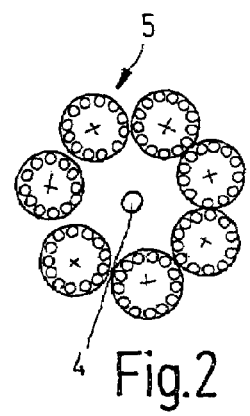
Fig.1
Fig.2
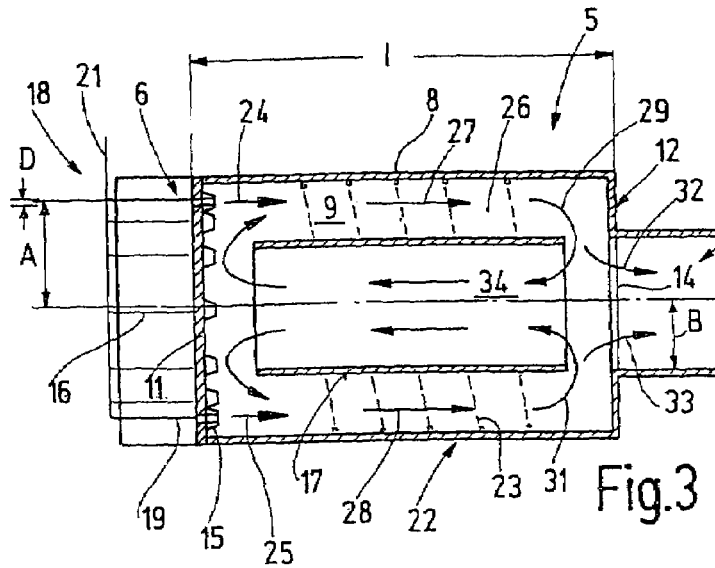
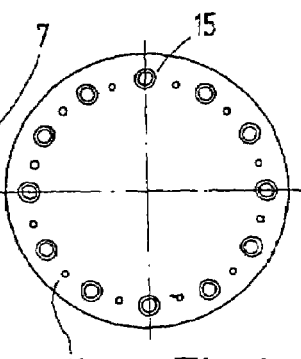
Fig.3
Fig.4
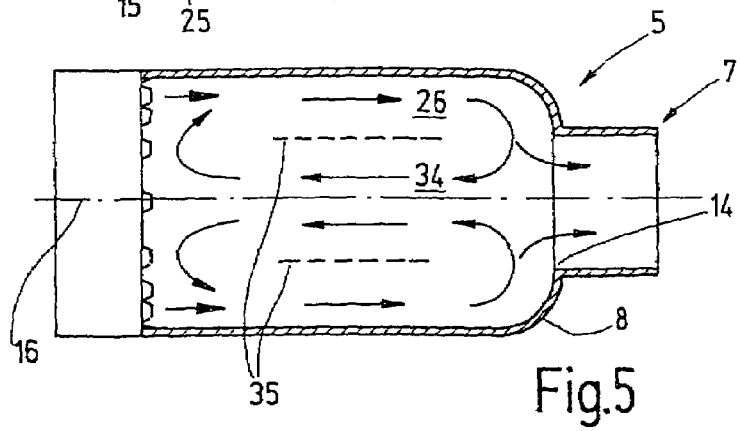
Fig.5
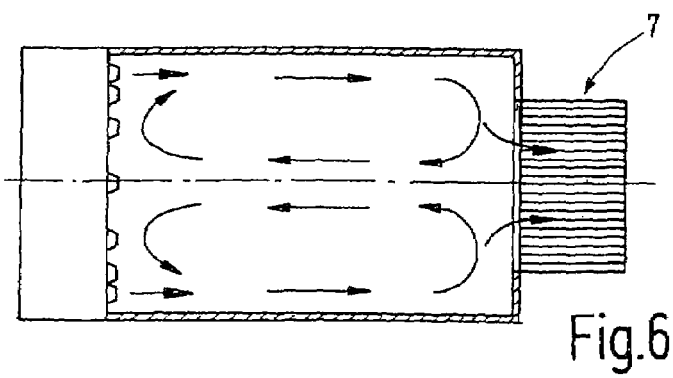
Fig.6

COMBUSTION CHAMBER WITH FLAMELESS OXIDATION

FIELD OF THE INVENTION

The invention relates to a combustion chamber for a gas turbine and a gas turbine equipped with such a combustion chamber.

BACKGROUND OF THE INVENTION

Gas turbines are used to convert heat energy to mechanical energy that can be delivered to a shaft (e.g., in a power plant, ship power plant, helicopter) or delivered as thrust (aircraft). All gas turbines have combustion chambers in which a fuel is burned with excess air. During combustion, a stable flame is formed in the combustion chamber. The gas flow, which has a very high velocity at the compressor outlet, is generally initially slowed for stabilization. Appropriate systems are provided to form stable flames. For example, small eddies are generated in the combustion chamber for flame stabilization. Combustion occurs with excess air so as not to cause thermal overload of the combustion chamber and turbine.

Flameless oxidation of a fuel in a corresponding reaction space is known from EP 0463218B1. Flameless oxidation is achieved at high combustion temperatures when the fuel is introduced to a gas stream containing hot exhaust and oxygen.

Combustion chambers of gas turbines have several design requirements. These include minimizing pressure loss, maximizing combustion, producing (just) under the maximum exhaust temperatures (to spare the turbine), and limited generation of $NO_x$.

OBJECTS AND BRIEF SUMMARY OF THE INVENTION

In view of the foregoing, an object of the present invention is providing a combustion chamber that has low $NO_x$ generation and is suitable for use in gas turbines.

The combustion chamber according to the invention is configured for flameless oxidation. This is achieved by aligning the inlet and outlet so that a large-volume recirculation flow is formed in the internal space of the combustion chamber. As a result of this, larger amounts of hot exhaust gases are mixed with the supplied fresh air. Preferably, the ratios are preferably such that at least twice as much exhaust stream is mixed with the fresh air stream. Consequently, a situation can be achieved in which the mixture of fresh air and exhaust has a temperature above the ignition temperature of the fuel. The flameless oxidation that develops does not rely on formation of a stable flame. Therefore, relatively high gas velocities can be used and the oxidation of the fuel extends over a larger zone between the inlet and outlet.

The large-volume recirculation flow can also be configured to be relatively low loss with the combustion chamber having low flow resistance and therefore causing only limited pressure losses. Pressure losses of around less than 3% of the combustion chamber pressure are attainable. The fresh air is compressed and preferably fed to the combustion chamber as an air jet without rotation. Ordered flow is produced.

The new combustion chamber permits high power densities (for example 100 $MW/m^3$). Flame collapse and blowback are, in principle, impossible. $NO_x$ concentrations of less than 10 ppm are achieved.

To form flameless oxidation while simultaneously achieving a combustion chamber with low flow resistance and a compact design, the fuel is introduced to the combustion chamber in the same direction as the fresh air. As a result, local eddies, which otherwise might contribute to an increase in pressure loss, are largely reduced.

The combustion chamber is preferably laid out with an internal recirculation of 2 to 5. This means that fresh air is mixed in with two to five times as much exhaust gas.

The air and fuel are preferably introduced coaxially in adjacent jets or in jets otherwise arranged next and essentially parallel to each other in the combustion chamber. The feed to the combustion chamber preferably occurs from the end wall in the area adjacent to the outer wall of the combustion chamber, i.e., in a radially outward lying area of the end wall. As a result, fresh air and fuel are initially introduced into the combustion chamber in flow essentially parallel to the wall. The outlet of the combustion chamber is preferably oriented in the same or the opposite direction with the outer boundary of the outlet being closer to the center axis of the combustion chamber than the air nozzles at the inlet into the combustion chamber. A recirculation stream of larger volume can be achieved with this expedient. The recirculation stream is guided along the wall from the inlet to the outlet of the combustion chamber, and then flows back from the outlet to the inlet, preferably on the center axis of the combustion chamber.

The inlet of the combustion chamber is preferably formed by several air inlet nozzles that act as fresh air jets guiding fresh air into the internal space. The air nozzles are also preferably formed so that the emerging air jet exerts an injector effect for return flow of exhaust gases. This can be achieved by a conical section protruding above the end wall of the combustion chamber.

The combustion chamber can be part of individual combustion chambers arranged in relation, which are also referred to as tubular combustion chambers. As an alternative, the combustion chamber can be laid out as an annular combustion chamber. In stationary installations alternative combustion chamber shapes are also possible.

The combustion chamber is preferably designed so that it has only a single circulation center (turbulence center). In the tubular combustion chamber this turbulence center is a line or surface arranged coaxial to the longitudinal axis of the combustion chamber. The circulation stream is a toroidal stream that encompasses the entire internal space of the combustion chamber. In the annular combustion chamber, in which the air nozzles belonging to the inlet are arranged, the turbulence center can also formed on an outer rim in the end wall by a circular line aligned coaxial to the longitudinal axis of the combustion chamber. This circular line is preferably roughly parallel to the line along which the air nozzles are arranged.

The combustion chamber is preferably provided with a preheating device for bringing the combustion chamber to a temperature suitable for flameless oxidation at the start of operation. The preheating device is formed, for example, by temporarily operated burners that can form a flame by means of electric heating or other heat sources.

The combustion chamber can be coated on its inside wall with a catalytically active material. In addition, a guide element with a catalytic surface can be arranged in the combustion chamber. A catalyst can also be arranged at the outlet of the combustion chamber.

BRIEF DESCRIPTION OF THE DRAWINGS

FIG. 1 is a schematic side view of a gas turbine according to the invention.

FIG. 2 is a front view of the combustion chambers of the gas turbine of FIG. 1.

FIG. 3 is a schematic longitudinal section view of an individual combustion chamber.

FIG. 4 is a front view of the combustion chamber of FIG. 3.

FIG. 5 is a longitudinal section view of an alternative embodiment of a combustion chamber according to the present invention.

FIG. 6 is a longitudinal section view of another alternative embodiment of a combustion chamber according to the present invention.

DETAILED DESCRIPTION OF THE INVENTION

Figure 8:
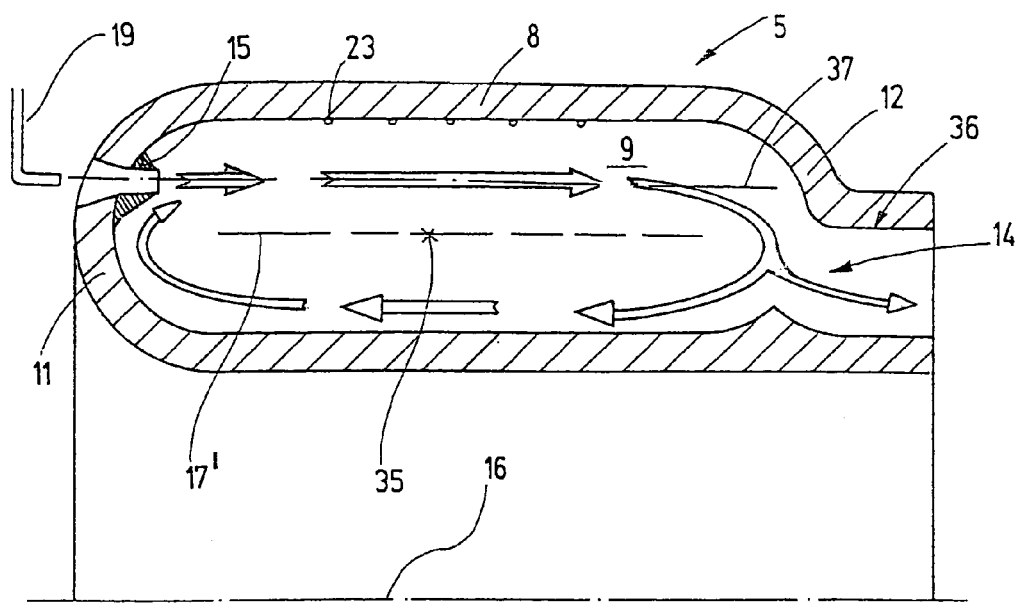
FIG. 8 is a longitudinal section view of the combustion chamber of FIG. 7.

A gas turbine 1 having a compressor 2, a turbine 3, which is connected to the compressor 2 via a shaft 4, and at least one combustion chamber 5, is shown in FIG. 1. Each combustion chamber has an inlet 6, which is fed compressed air from compressor 2, and an outlet 7, which supplies the gas stream generated in combustion chamber 5 to turbine 3.

As shown in FIG. 2, the combustion chambers 5 can be roughly can-type burners which together form a combustion chamber set. A single such combustion chamber 5 is shown in FIG. 3. The combustion chamber has an internal space 9 enclosed by a wall 8, which is essentially cylindrical. On the inlet side, an end wall 11, which can be flat, is part of the wall 8. On the opposite side, an end wall 12 is formed in which an opening 14 with radius B that defines the outlet 7 is arranged. A series of air nozzles 15 that, as shown in FIG. 4, are arranged in a circle serves as the inlet 6. The air nozzles 15 are arranged in the vicinity of the wall 8 at a radius A, greater than the radius B of opening 14, from the imaginary center axis 16 of the combustion chamber 5. In a practically tested embodiment, the diameter D of the nozzle opening of the air nozzles 15 is roughly $1/50^{th}$ the length 1 of combustion chamber 5 measured along center axis 16. The diameter of the combustion chamber is about half its length. The figures are not to scale.

A guide tube 17 can be arranged in the internal space 9 concentric to the center axis 16. The guide tube 17 is shorter than the length of the internal space 9. This diameter corresponds to roughly the diameter of the opening 14. The guide tube is spaced from the end walls 11 and 12 a distance that is somewhat less than its radius. An arrangement for fastening the guide tube 17 to the wall 8 or end walls 11, 12 (e.g. bars) are not shown.

The air nozzles 15, as shown in FIG. 3, extend into the internal space 9. For example, the air nozzles have a roughly truncated conical contour. The air nozzles are designed so that they produce a straight air jet that causes an injector effect. A fuel feed device 18 is provided to supply fuel. This is formed, for example, by fuel nozzles 19 that are fed by a central line 21. The fuel nozzles 19 can discharge right in front of an air nozzle 15. One fuel nozzle 19 can then be assigned to each air nozzle 15. It is also possible to assign fuel nozzles 19 to only some of the air nozzles 15. In addition, the fuel nozzles 19 alternatively can be arranged between air nozzles 15, as shown in FIG. 4. The number of fuel nozzles 19 can match or differ from the number of air nozzles 15. The fuel nozzles 19 and the air nozzles 15 have the same outflow direction, i.e., the air and fuel are introduced into the internal space 9 in the same direction.

The combustion chamber 5 also has a preheating device 22 for startup. In the illustrated embodiment, the preheating device is formed by a spiral-wound filament that can be heated electrically and is accommodated on the inside of wall 8. As an alternative, a burner, an arc generation device or another controllable heat source can be provided.

The combustion chamber 5 thus described operates as follows:

During operation of the gas turbine 1, the combustion chamber 5 receives compressed fresh air preheated by compression at its inlet 6. For example, the pressure can be in the range from 10 bar to 20 bar. The air is divided among the individual air nozzles 15 and therefore enters the internal space 9 in the form of jets roughly parallel to the cylindrical wall 8. This is shown by arrows 24, 25 in FIG. 3. The temperature in the internal space 9 is increased by the spiral-wound filaments 23 so that the introduced fuel is ignited. The fuel is fed fuel nozzles 19 along with the fresh air stream, into the internal space 9 in the direction of arrows 24, 25. The fuel now reacts in this internal space on its way from the air nozzles 15 to the end wall 12. The annular channel formed between the outside of the guide tube 17 and the inside of the wall 8 therefore forms a reaction channel 26 that is traversed by the fresh air and fuel in the direction of arrows 27, 28.

The end of the reaction channel 26 is covered by end wall 12 so that the flow, which is indicated by arrows 29, 31 is reversed. Only a relatively smaller portion of the formed reaction products flows via the outlet 7 through the turbine 5 as hot gas, as shown by arrows 32, 33. The relatively larger portion recirculates through the guide tube 17 back to the end wall 11, therefore establishing a recirculation channel 34. The exhaust flowing back in the recirculation channel 34 is at the combustion chamber outlet temperature, for example 1300° C. The mass flow rate is two to five times the feed flow rate of the air through inlet 6.

The back-flowing gases are deflected radially on the end wall 11 and drawn into the reaction channel 26 by the inflowing fresh air with an injector effect. The hot exhaust mixes with the inflowing fresh air. The mixing temperature lies above the ignition temperature of the supplied fuel, for example above 720° C. The fuel fed with the fresh air therefore oxidizes completely, roughly along the length of the guide tube 17 within the reaction channel 26, without forming flame phenomena. No local temperature peaks develop within the gas volume.

After heating of the combustion chamber 8 and assumption of the described stable flameless operation, the preheating device 22 can be switched off. The flameless oxidation can be maintained in full and partial load operation as long as it is ensured that the combustion chamber 8 is overall kept at a temperature above the ignition temperature of the fuel, and as long as the illustrated flow pattern is maintained. The guide tube 17 here forms the areal turbulence center of the forming large-volume recirculation stream that has a tirelike or toroidal shape. The turbulence center is therefore stably localized and is coaxial to the center axis 14.

In an alternative embodiment of the combustion chamber 5 shown in FIG. 5, the circulation flow is achieved merely by arranging the air nozzles 15 on the rim (such as shown in FIG. 4) and arranging of the openings 14, and optionally by shaping of wall 8. The recirculation channel 34 and reaction channel 26 in this case are not separated from each other by fixtures, but are determined by the forming flow. The turbulence center of the recirculation flow is indicated with a dashed line in FIG. 5 at 35. It lies concentric to the center axis 16.

In a further embodiment, a high temperature catalyst is arranged in outlet 7. This serves for reaction acceleration, especially in the lower temperature ranges.

Figure 7:
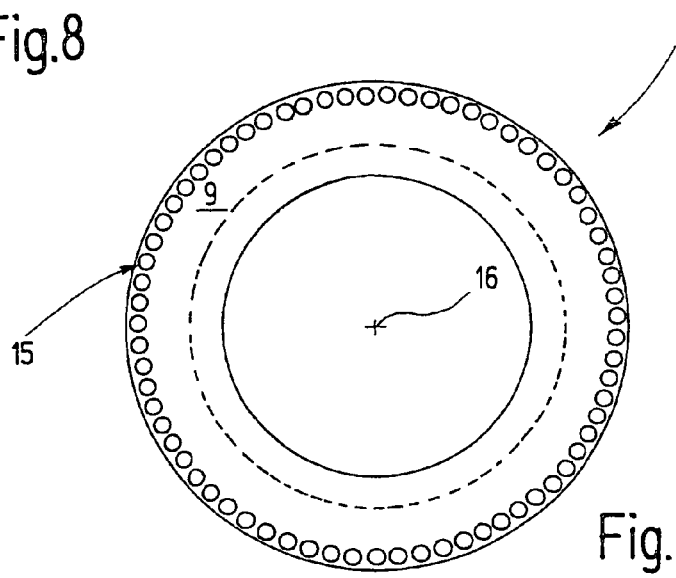
FIG. 7 is a front view of an alternative embodiment of a combustion chamber according to the invention in which the combustion chamber is configured as an annular combustion chamber.

Another embodiment of the combustion chamber 5 is shown in FIGS. 7 and 8. This embodiment is designed as an annular combustion chamber. Where reference numbers used thus far are employed, the previous description applies accordingly. The following explanations serve as a supplement.

The combustion chamber 5 is an annular internal space 9 arranged concentric to the longitudinal center axis 16 and enclosed by the wall 8 both toward the center axis 16 and also outward. As shown in FIG. 8, the wall 8 can transition into the end walls 11, 12 with a curvature that is favorable from the standpoint of flow. Air nozzles 15 that lie on a circle concentric to the center axis 16 are arranged in the end wall 11 (FIG. 7). The flow direction established by air nozzles 15 is essentially parallel to the center axis 16. The end wall 12 can be provided with an annular slit-opening 14 or instead with a series of individual openings 14 arranged on a rim. The outer rim, i.e., the limitation 36 lying farthest outward radially, is arranged far enough inward radially that the air jet emerging from air nozzle 15 strikes the end wall 12 radially farther out. In other words, as in the previous embodiments, the imaginary linear extension 37 of the air nozzle 15 intersects the end wall 12 outboard of the opening 14. Accordingly, the flow emerging from the air nozzle 15 is diverted by 180° before the outlet 7 and for the most part flows back to the end wall 11, where it is diverted again by 180°. A large circulating flow is formed that runs along the entire length of the wall 8 of the combustion chamber 5. The turbulence center 35 is arranged concentric to the center axis 16. It passes through the internal space 9 roughly in the center. As shown with the dashed line, it can be established by a guide device 17' or merely by the shape of wall 8. As in the previous embodiments, flameless oxidation occurs, with a complete reaction between the fuel and the supplied fresh air on the way from the air nozzle to the end wall 12 so that only waste gases are recirculated.

Figure 9:
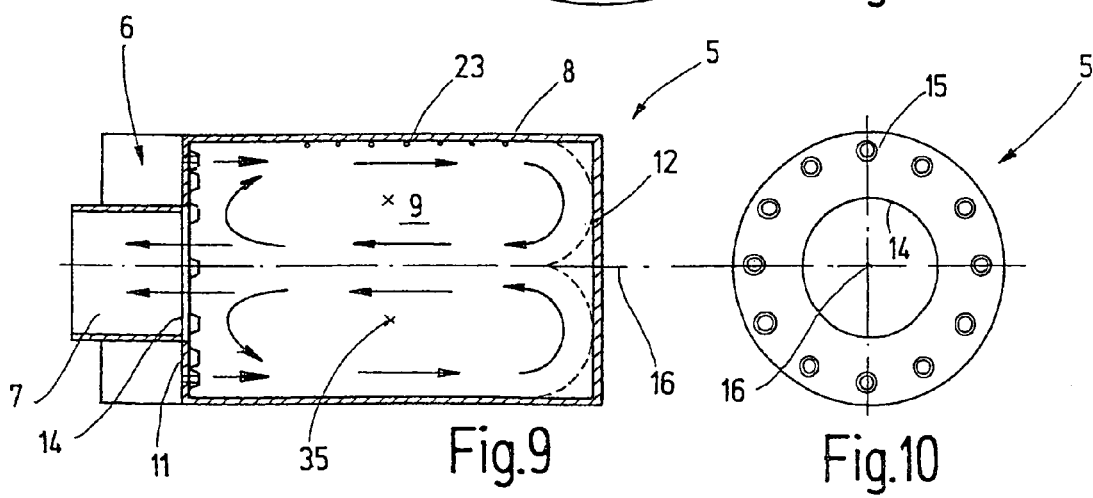
FIG. 9 is a longitudinal section view of an alternative embodiment of a combustion chamber according to the invention having reverse flow.
Figure 10:
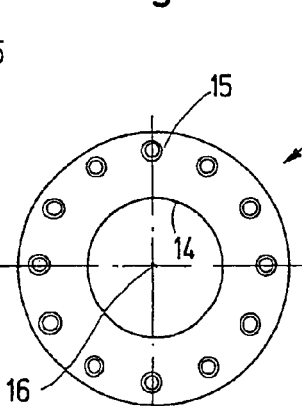
FIG. 10 is a front view of the combustion chamber of FIG. 9.

Another embodiment of the combustion chamber 5 according to the invention is shown in FIGS. 9 and 10. The comments made relative to the combustion chambers according to FIGS. 3 to 5 apply accordingly. The following applies in addition:

The combustion chamber 5 according to FIG. 9 operates with reverse flow. Whereas in the preceding combustion chambers, the inlet 6 and the outlet 7 are arranged on opposite ends 11, 12 of combustion chamber 5, the inlet 6 and outlet 7 in combustion chamber 5 of FIG. 9 are arranged on the same end 11 of combustion chamber 5. This design is suitable for turbines of relatively less power. It is typically applicable to turbines with radial compressors. The air nozzles 15 are arranged on a circle that encloses the opening 14 provided in end wall 11. The air nozzles 15 and the opening 14 are arranged concentric to the center axis 16. The circulating flow that forms (arrows in FIG. 9) again has an annular circulation center 35 positioned concentric to the center axis 16. The circulation flow has a mass flow rate that exceeds the mass flow rate of the supplied fresh air by a factor of two to five.

In comparison with the embodiments just described, the advantage of the FIGS. 9 and 10 embodiment of the combustion chamber 5 is that almost the entire internal space 9 is utilized as a reaction space. Both the path from the air nozzle to the end wall 12 and the path from the end wall 12 to the outlet 14 can be used for reaction of the fuel. As a result, a very compact design is possible.

If necessary, the circulation center 35 can be fixed or stabilized by a guide tube 17. In addition, the end wall 12 (shown with a dashed line in FIG. 9) can be curved as a torus, i.e., designed as a channel running around the center axis 16.

A combustion chamber 5 for a gas turbine is adapted for flameless oxidation of fuels. To this end, the combustion chamber has an internal space 9 in which a larger recirculation flow is established. This recirculation flow feeds the introduced air to a hot exhaust stream whose flow rate exceeds that of the fresh air stream. The fresh air and the fuel are fed to the combustion chamber in the same direction, roughly parallel to the wall.

The invention claimed is:

1. A gas turbine comprising:
   a compressor;
   a turbine;
   a combustion chamber having a wall that encloses and defines an internal reaction space having a longitudinal axis, said combustion chamber having inlets for directing air and/or fuel into said internal space in substantially parallel relation to said longitudinal axis, said combustion chamber having an outlet coaxially located on said longitudinal axis and connected to said turbine for discharging exhaust gases to said turbine,
   said internal space being configured such that a relatively large circulating gas flow stream can be formed in the internal space so as to maintain a flameless oxidation process, and
   said inlets each being disposed a distance from said longitudinal axis greater than the radius of said discharge orifice.

2. The gas turbine compressor according to claim 1, wherein the cross sectional configurations of said inlets and said outlet and the geometry of the internal space are designed such that the gas stream circulating in the internal space has a mass flow rate greater than twice a mass flow rate of the fresh air introduced into the inlet.

3. The gas turbine compressor according to claim 1, wherein said inlets include a plurality of air nozzles arranged in said by side relation next to each other in a row.

4. The gas turbine compressor according to claim 3, wherein each air nozzle has a portion extending beyond the wall.

5. The gas turbine compressor according to claim 3, wherein the air nozzles have a common orientation.

6. The gas turbine compressor according to claim 3, wherein the combustion chamber has a cylindrical configuration and the air nozzles are arranged on a circle that is arranged concentric to combustion chamber.

7. The gas turbine compressor according to claim 1, wherein the combustion chamber is designed as a circular ring.

8. The gas turbine compressor according to claim 1, wherein said inlets and said the outlet are arranged and the geometry of the internal space is configured such that the circulating gas stream flow encompasses the entire internal space.

9. The gas turbine compressor according to claim 1, wherein a circulating gas stream flow generated in said internal space has only a single turbulence center.

10. The gas turbine compressor according to claim 1, wherein the combustion chamber includes a preheating device.

11. The gas turbine compressor according to claim 1, wherein a guide device is arranged in the internal space that divides the internal space into a mixing and reaction channel and a backflow channel.

12. The gas turbine of claim 1 in which said inlets direct air and fuel into said internal reaction chamber in the same direction.

13. The gas turbine of claim 1 in which said inlets include a plurality of air inlets disposed in a circular array having a diameter greater than the diameter of said outlet.

14. The gas turbine of claim 1 in which said inlets and outlet communicate with different axial ends of said internal reaction space.

15. The gas turbine of claim 1 in which said inlets and outlet communicate with a common axial end of said internal reaction space.

16. The gas turbine of claim 1 including a fuel feed device for directing fuel into and through said inlets.

17. A gas turbine comprising:
a compressor;
a turbine;
a combustion chamber having a wall that encloses and defines an internal reaction space having a longitudinal axis, said combustion chamber having air inlets connected to said compressor for directing air into said internal space, said combustion chamber having an outlet coaxially located an said longitudinal axis connected to said turbine for discharging exhaust gases to said turbine;

a fuel feed device for directing fuel into said internal space in a predetermined direction, said air inlets and said fuel feed device being operative for directing air and fuel into said internal reaction space in substantially parallel relation to said longitudinal axis, said internal space being configured such that a relatively large circulating gas flow stream can be formed in the internal space so as to maintain a flameless oxidation process, and said air inlets defining a diameter greater than the diameter of said exhaust gas outlet.

18. The gas turbine of claim 17 in which said air inlets and fuel feed device direct air and fuel are introduced into said internal reaction chamber in substantially the same direction.

19. The gas turbine of claim 17 in which said air inlets are disposed in a circular array having a diameter greater than the diameter of said outlet.

20. The gas turbine of claim 17 in which said inlets and outlet communicate with different axial ends of said reaction space.

* * * * *